(12) United States Patent
Wakamoto

(10) Patent No.: US 6,283,760 B1
(45) Date of Patent: Sep. 4, 2001

(54) LEARNING AND ENTERTAINMENT DEVICE, METHOD AND SYSTEM AND STORAGE MEDIA THEREFOR

(76) Inventor: Carl Wakamoto, 5930 Topeka Dr., Tarzana, CA (US) 91356

( * ) Notice: Subject to any disclaimer, the term of this patent is extended or adjusted under 35 U.S.C. 154(b) by 0 days.

(21) Appl. No.: 09/139,037

(22) Filed: Aug. 24, 1998

Related U.S. Application Data

(63) Continuation-in-part of application No. 08/821,889, filed on Mar. 21, 1997, now Pat. No. 5,810,598, which is a continuation of application No. 08/327,510, filed on Oct. 21, 1994, now abandoned.

(51) Int. Cl.$^7$ .................................................. G09B 19/00
(52) U.S. Cl. .................... 434/156; 434/185; 434/307 R; 360/69; 386/39; 348/564
(58) Field of Search ..................... 434/118, 156, 434/157, 169, 185, 307 R, 307 A, 308, 309, 318, 323, 362, 365; 348/10–12, 61, 468, 473, 478, 486, 488, 563, 564, 571; 345/302, 435; 386/39, 81, 85, 95, 124; 360/13, 22, 32, 33.01, 49, 7, 61, 69, 70, 77.01; 381/51, 80; 369/2, 48, 178, 192; 455/6.2, 6.3, 41, 174.1, 295, 345; 84/477 R, 454, 601, 603, 609, 610, 616, 625, 630, 631, 645, 646, 654, 634; 379/55.1; 370/472, 474, 538, 543

(56) References Cited

U.S. PATENT DOCUMENTS

| | | |
|---|---|---|
| 3,955,466 | 5/1976 | Goldmark . |
| 4,211,997 * | 7/1980 | Rudnick et al. ................. 714/758 |
| 4,352,200 * | 9/1982 | Oxman ................................ 455/41 |
| 4,392,162 * | 7/1983 | Yamamoto ......................... 386/81 |
| 4,748,501 | 5/1988 | Long . |
| 4,847,698 | 7/1989 | Freeman . |
| 4,989,097 * | 1/1991 | Yoshio et al. ...................... 386/95 |
| 5,111,409 * | 5/1992 | Gasper et al. ................... 345/302 |
| 5,270,475 * | 12/1993 | Weiss et al. ...................... 84/603 |
| 5,341,253 | 8/1994 | Liao et al. . |
| 5,433,609 | 7/1995 | Deaver et al. . |
| 5,487,671 * | 1/1996 | Shpiro et al. .................... 434/185 |
| 5,569,038 * | 10/1996 | Tubman et al. .................. 434/308 |
| 5,623,344 * | 4/1997 | Lane et al. ......................... 386/81 |
| 5,679,001 * | 10/1997 | Russell et al. ................... 434/185 |
| 5,692,906 * | 12/1997 | Corder ............................. 434/156 |
| 5,766,015 * | 6/1998 | Shpiro ............................. 434/156 |
| 5,810,599 * | 9/1998 | Bishop ............................. 434/157 |
| 5,820,384 * | 10/1998 | Tubman et al. .................. 434/308 |
| 5,903,569 * | 5/1999 | Fujisaki ............................ 370/472 |

FOREIGN PATENT DOCUMENTS

| | | |
|---|---|---|
| 0455293A1 * | 11/1991 | (EP) . |
| 0503480A2 * | 9/1992 | (EP) . |
| 0735766A1 * | 10/1996 | (EP) . |
| 5-46070 | 2/1993 | (JP) . |

* cited by examiner

*Primary Examiner*—Joe H. Cheng
(74) *Attorney, Agent, or Firm*—Merchant & Gould P.C.

(57) ABSTRACT

A pronunciation practice system, device and method allows the user, while watching the television screen, to speak the part of the character which has been selectively turned off, and to check his pronunciation with the subtitle or voice playback simultaneously or successively, thus making it possible to learn a language enjoyably and effectively while at the same time watching attractive images and listening to music. The system, device and method allow pronunciation to be practiced effectively by selecting a first sound signal and a second sound signal from a first sound channel CH1 and a second sound channel CH2, turning at least one of the voices from one of the channels off, and processing this voice which has been turned off with the aid of mixers and a speaker with attached microphone.

16 Claims, 11 Drawing Sheets

(a)  (b)

(c)

(d)  (e)  (f)

(g)

LEARNING AND ENTERTAINMENT DEVICE, METHOD AND SYSTEM AND STORAGE MEDIA THEREFOR

RELATED APPLICATION

The present invention is a continuation-in-part of U.S. application Ser. No. 08/821,889 filed Mar. 21, 1997, now U.S. Pat. No. 5,810,598, which is a file-wrapper-continuation of Ser. No. 08/327,510 filed Oct. 21, 1994, now abandoned and which are incorporated herein by reference.

BACKGROUND OF THE INVENTION

1. Field of the Invention

The present invention relates generally to learning and entertainment devices, methods and systems, and in particular embodiments, to a pronunciation, teaching and practice device which utilizes videos, CDS and other storage media.

2. Related Art

English conversation and other forms of language study have become popular in recent years, and various types of practice device and method are employed. Practice face-to-face with a teacher is the most common method, but systems which permit practice at home either individually or in small groups are also effective. The video-player is very popular in the ordinary home, but it is normally used for recording broadcast programmes or playing rented video tapes, and its use is limited if applied to the study of English (or other language) conversation without further modification. The problem is that practice becomes one-sided, and it is impossible to practice living conversation enjoyably. Moreover, it is not very effective.

Recent years have seen the emergence of new storage media such as CDS(CD family) and DVDS, but no proposals have been made for their use as effective pronunciation practice devices.

SUMMARY OF THE DISCLOSURE

Accordingly, an embodiment of the present invention relates to a device, method or system which enables a user to practice language and pronunciation skills effectively and enjoyably by using a video-player without further modification.

Moreover, preferred embodiments of the present invention involve a format which enables the learner to practice pronunciation effectively by using compact discs (CDs) and storage media which permit the recording of images without any modification to the playback device, and further involve a pronunciation practice device and method for that purpose.

In addition, further preferred embodiments of the present invention involve a format which enables the learner to practice pronunciation effectively with an admixture of subtitles by using digital video discs (DVDS) and modem multimedia storage media without any modification to the playback device, and further involve a pronunciation practice device and method for that purpose.

According to a preferred embodiment of the present invention, a learning system comprises a monitor television, a video-player connected to this monitor television, and a storage medium in which prescribed image signals and sound signals are stored, a first sound signal and a second sound signal of the storage medium corresponding respectively to a first sound channel and a second sound channel of the monitor television, and a switching means for being provided whereby to switch between the first sound channel and the second sound channel in such a manner as to make it possible to select the first sound signal and the second sound signal of the storage medium set in the video-player, structured in such a manner that during playback of the storage medium it is possible while watching the playback image on the monitor television to use the means of switching in order to turn off at least one of the sounds provided by the first and second sound signals, a first mixer and a second mixer having input/output portions which correspond respectively to the first sound channel and the second sound channel, the input portions being connected to each other, while this connection is further connected to the video-player or to a means of control whereby this is controlled, the output of the first mixer being connected to a speaker of the monitor television, and the output of the second mixer to a microphone and an audio-phone (i. e. an ear-phone or a headphone) used by the operator, the sound signal which is output from the microphone being input to the first mixer, and the sound which has been turned off being audible to the operator through the audio-phone, while the sound of the operator input through the microphone is audible other than to the operator in place of the sound which has been turned off.

A storage medium (i.e. Laser Disc, video disc, video CDs, karaoke CDs, CD-IDV), according to preferred embodiments, stores image data and sound data corresponding to the images in a plurality of separate channels, wherein at least in part of the practice area, the sound data relating to two predetermined sounds (e.g. the voices of characters A and B whose images are displayed) out of a plurality of types of sound which are to be played back (i.e., which correspond to the images) is allocated during storage respectively to the first sound channel (e.g. left-hand channel) and second sound channel (e.g. right-hand channel), respectively. In the above structure, only specific sounds are stored from each sound channel. As described in further detail below, the selective use of sounds from each channel can be controlled to allow pronunciation to be practiced.

The term "sound" as used herein includes not only the human voice, but other sounds as well, including, but not limited to, the sounds of specific musical instruments-for instance. In other words, the present invention may be adapted for use not only in language study and vocal practice, but for practicing musical instruments and other purposes.

Thus, according to a preferred embodiment of the present invention, a pronunciation practice system employs a storage medium as described above and is structured in such a manner as to facilitate pronunciation practice, wherein the system includes:

a) a sound feed device which feeds sound individually to a user engaged in pronunciation practice,
  b) a sound input device which changes voices uttered by the user into a sound signal,
  c) a switch having two input terminals and two output terminals, the sound signal of the first sound channel and the sound signal of the second sound channel being input to both of the input terminals in parallel way, while in a first selection state (e.g. when character A is selected) the sound signal of the first sound channel is output from the first output terminal, the sound signal of the second sound channel being output from the second output terminal, and in a second selection state (e.g. when character B is selected) the sound signal of the first sound channel is output from the second output terminal, the sound signal of the second sound channel being output from the first output terminal, d) an amplifier which feeds the sound signal fed from the first input terminal of the switch to the sound feed device, and e) a mixer which synthesizes the sound signal fed from the second output terminal of the switch with the sound signal-from the sound input device, and outputs them as a sound input signal corresponding to the displaying image by a playback device. Under "voice" as used here is subsumed not only the human voice, but the sound of playing musical instrument. The switch may be, for example, a normal audio switch or an audio mixer structured in such a manner that it is possible to alter the output level channel by channel. It may be housed within the playback device or form part of a device which combines at least two of the above switch, mixer and amplifier. In the sound feed device and monitor device it is possible to set each of the sound input signals at will, and to decide whether output is from the left-hand stereo channel or from the right-hand channel. It is also possible to partition the sound signal from one channel between the left-hand and right-hand channels when listening.

A storage medium (i.e., medium suitable for multimedia like DVD and the like), according to preferred embodiments of the invention, stores images and subtitle data relating to the sounds uttered during the course of these images in a plurality of subtitle channels, having a first subtitle channel wherein in at least part of a practice area subtitle data is added only in relation to a specific predetermined sound (e.g. the sound of character A) from among a plurality of types of sound (which are to be played back to correspond with the images), the addition of subtitle data in relation to sounds other than the specific sound (e.g. the sound of character B) being prohibited, and a second subtitle channel wherein the addition of subtitle data in relation to the specific sound is prohibited, while subtitle data is added in relation to sounds other than the specific sound. The first subtitle channel is, for example, for the purpose of displaying only the words spoken by a specific character among the characters displayed on the screen, while the second subtitle channel is for the purpose of displaying the words spoken by characters other than the specific character.

A storage medium according to preferred embodiments has, in addition, a third subtitle channel wherein subtitle data is added not only in relation to the specific sound but also in relation to sounds other than the specific sound. In other words, regular subtitle data is also added.

The above storage medium has a first sound channel wherein in the practice area sound data is stored only in relation to the. specific sound, and a second sound channel wherein sound data is stored only in relation to sounds other than the specific sound. For instance, a specific character is allocated to the first sound channel, and other characters to the second sound channel. The above storage medium has in addition a control data storage area (e.g. an information portion or segment play portion after the lead-in area) wherein is stored control data which allows the sound data of the first sound channel to be output as a first sound and the sound data of the second sound channel as a second sound when the specific sound (e.g. the sound of character A) is designated, while allowing the sound data of the second sound channel to be output as a first sound and the sound data of the first sound channel as a second sound when a sound other than the specific sound (e.g. the sound of character B) is designated. It has in addition a third sound channel wherein in the practice area sound data is added not only in relation to the specific sound but also in relation to sounds other than the specific sound.

Moreover, the above storage medium has in addition a control data storage area wherein is stored control data which allows the sound data of the first sound channel to be output as first sound and the sound data of the third sound channel as second sound when the specific sound is designated, while allowing the sound data of the second sound channel to be output as first sound and the sound data of the third sound channel as second sound when the specific sound is not designated. In other words, regular sound data is also added.

In further preferred embodiments, the storage medium has, in addition, a control data storage area for use in playback control wherein is stored menu data in which jump destination data is set, making it possible to jump to the practice area in accordance with the command of the user.

The menu data is preferably structured in such a manner as to make it possible to select slow mode, allowing the image data to be played back in slow mode in the practice area which is set as a jump destination of the slow mode, the sound height of the sound signal being the same as at normal speed by virtue of the fact that the same waveform is repeated a prescribed number of times in a uniform cycle, and the sound being compressed during storage in such a manner that the playback time is of a length which corresponds to the image signal in slow mode.

Therefore, a pronunciation practice system according to one preferred embodiment of the invention utilizes the above storage medium, is structured in such a manner as to facilitate pronunciation practice, and has:

a) a sound feed device which feeds sound individually to a user engaged in pronunciation practice by causing it to correspond to the first sound output fed from the playback device which plays back the storage medium, b) a sound input device which changes sounds uttered by the user into a sound signal, and c) a mixer which synthesizes the sound signal from the sound input device with the second sound output fed from the playback device, and outputs them as a sound input signal corresponding to the displaying image by the playback device.

Here, for instance, the sound feed device and sound input device comprise a headset having a speaker which is structured in such a manner as to be capable of feeding sound individually to the ears of the user, and a microphone which changes the sound of the user into a sound signal.

Moreover, the sound feed device and sound input device may comprise a receiver which feeds sound to the ears of the user and receives the user's sound while the user grasps it.

Furthermore, the sound feed device and sound input device may comprise a microphone set having a microphone which changes the sound of the user into a sound signal and an earphone which feeds sound to the ears of the user, wherein the microphone has a retaining member, which holds the earphone, in a part of the microphone's body.

A method of pronunciation practice according to one preferred embodiment of the invention utilizes a storage medium wherein the channel by which sound is output from the playback device is fixed:

a) During pronunciation practice using the sound of the first sound channel, sound corresponding to the sound signal of the first sound channel by playing the storage medium back is fed to the ears of the user, while sound corresponding to a sound signal obtained through synthesis of the sound signal of the second sound channel with a sound signal generated in response to the user's pronunciation is fed in such a manner as to be audible to an audience, and b) During pronunciation practice using the sound of the second sound channel, sound corresponding to the sound signal of the second sound channel by playing the storage medium back is fed to the ears of the user, while sound corresponding to a sound signal obtained through synthesis of the sound signal of the first sound channel with a sound signal generated in response to the user's pronunciation is fed in such a manner as to be audible to the audience.

Moreover, a method of pronunciation practice according to one preferred embodiment of the invention further utilizes a storage medium wherein the channel by which sound is output from the playback device is capable of being changed at will:

a) During pronunciation practice using the sound of the first sound channel, subtitles based on subtitle data of the first subtitle channel or the third subtitle channel and output by playing the storage medium back are displayed on the monitor device, while sound corresponding to the sound signal of the first sound channel and output by playing the storage medium back is fed to the ears of the user, sound corresponding to a sound signal obtained through synthesis of the sound signal of the second sound channel with a sound signal generated in response to the user's pronunciation being fed in such a manner as to be audible to an audience, and b) During pronunciation practice using the sound of the second sound channel, subtitles based on subtitle data of the second subtitle channel or the third subtitle channel and output by playing the storage medium back are displayed on the monitor device, while sound corresponding to the sound signal of the second sound channel and output by playing the storage medium back is fed to the ears of the user, sound corresponding to a sound signal obtained through synthesis of the sound signal of the first sound channel with a sound signal generated in response to the user's pronunciation being fed in such a manner as to be audible to an audience.

The term, "storage medium" is used herein to mean something on which information (mainly digital data, programs) is recorded by some kind of physical means or other, being such as can have the requisite function performed by a player or a processing device such as a computer. In other words, this need only be something that can provide sound data or subtitle data into a player or a computer by some means or other and cause the requisite function to be performed. Included in such media are, for example, magnetic tape like video tape or DAT tape, laser disc, video disc, video CD, karaoke CD, CD-IDV, CD-ROMs, DVD-R, DVD-ROM, DVD-RAM, flexible disks, MD, DCC, hard disks, photomagnetic disks, ROM cartridges, RAM memory cartridges equipped with battery back-up, flash memory cartridges, and non-volatile RAM cartridges. These shall extend to cases where data transfers are received from a host computer via wire or wireless communications lines (public lines, dedicated data lines, satellite circuits, etc.). The so-called Internet is also to be included in the recording media spoken of here.

DETAILED DESCRIPTION OF PREFERRED EMBODIMENTS

FIGS. 1–6 illustrate a first example embodiment whereby a pre-recorded video tape recording according to a preferred embodiment of the present invention is played back using the English (or other language) conversation practice device to which the present embodiment pertains, the device having been specially connected to a normal video-player and mixer.

Figure 5:
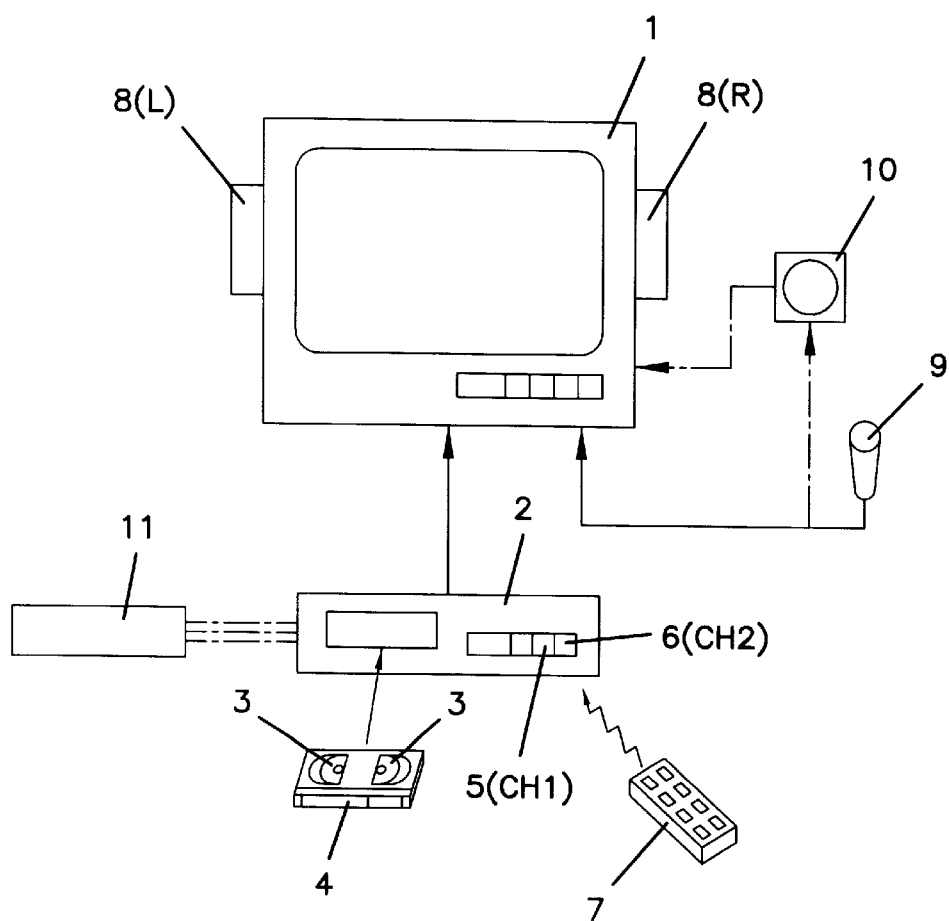
FIG. 5 is an overall outline drawing of the above practice device.
Figure 6:
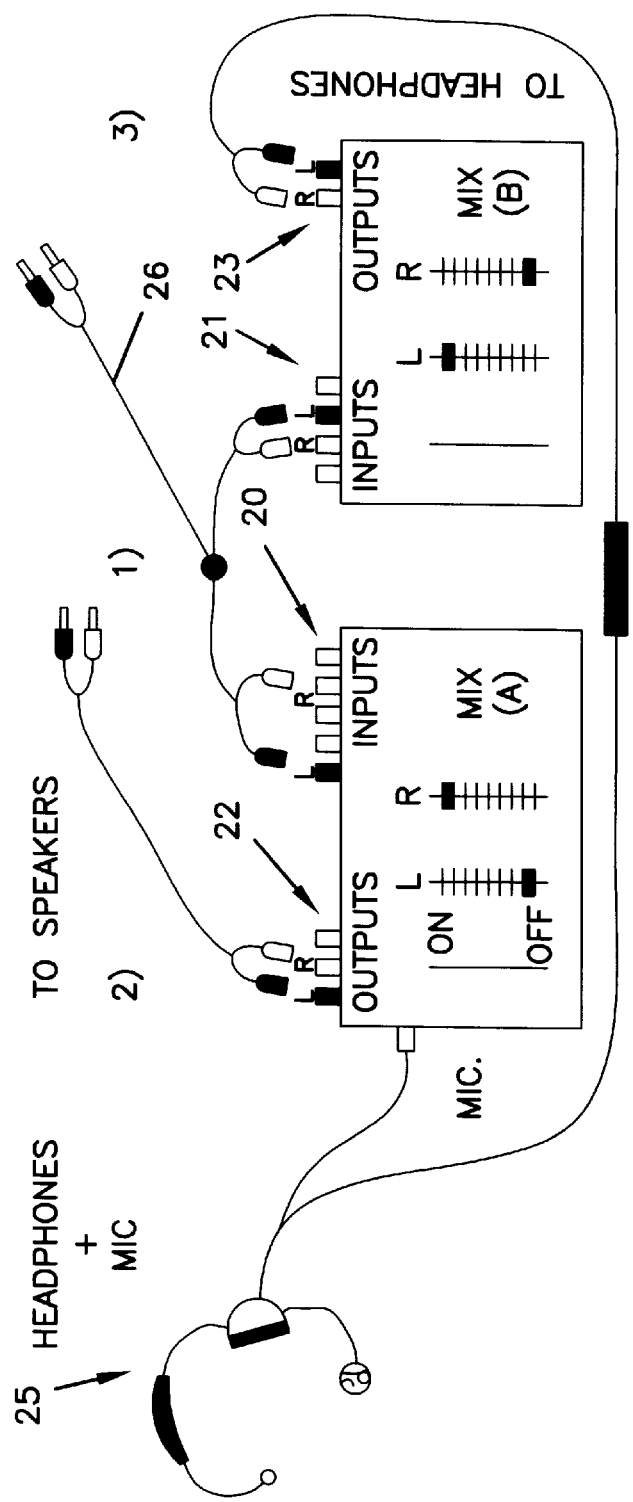
FIG. 6 is a partial outline drawing of the mixer in the above practice device.

As is shown in outline in FIG. 5, a system according to the first embodiment comprises a monitor television 1, a video-player 2 which is connected to this monitor television, a magnetic tape 3 on which the images and sound signals for use in English conversation have been recorded, and a tape cassette 4 which houses the tape. The cassette tape 4 is inserted into the video-player 2, and two switches 5 and 6 are provided so that when the tape is played back it is possible to select between sound channels CH1 and CH2 which correspond to different sound signals, for instance sound signal (1) and sound signal (2). The selection of these switches can be performed by the operator using a remote controller 7.

As will be explained later, the above sound signals (1) and (2) are recorded separately on to different voice tracks of a commercially available video tape (e.g. a ½" VHS tape). Selection of CH1 causes the voice of the sound signal (1) to be heard from the left-hand speaker 8 (L) of the television 1, while selection of CH2 causes the voice of the sound signal (2) to be heard from the right-hand speaker 8 (R). If both channels are selected, the respective voices of each of the sound signals (1) and (2) are played back simultaneously in stereo through the right and left speakers. Consequently, both the monitor television 1 and the video-player 2 need to be stereo and hi-fi.

It is also possible to connect a microphone (or a headphone, as will be explained later) 9 to the monitor television 1 so that the operator (or learner) can record his own voice and listen to it through a speaker 8 (L) or (R). As an option, it is also possible to connect a separate speaker 10.

Figure 1:
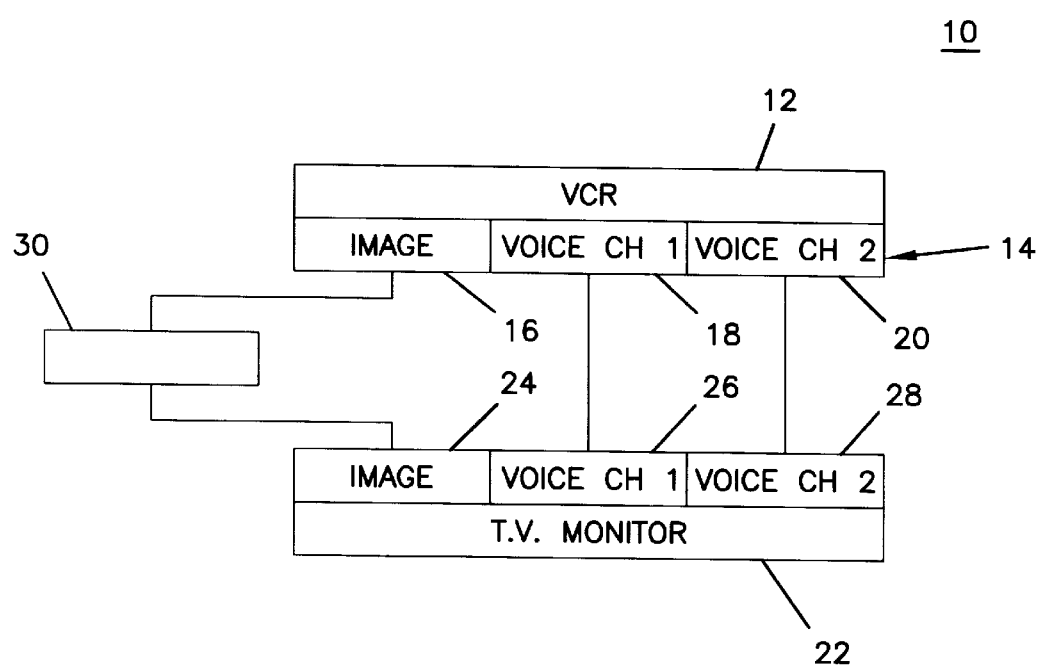
FIG. 1 is an outline system drawing of the video English conversation practice device to which the present invention pertains.
Figure 2:
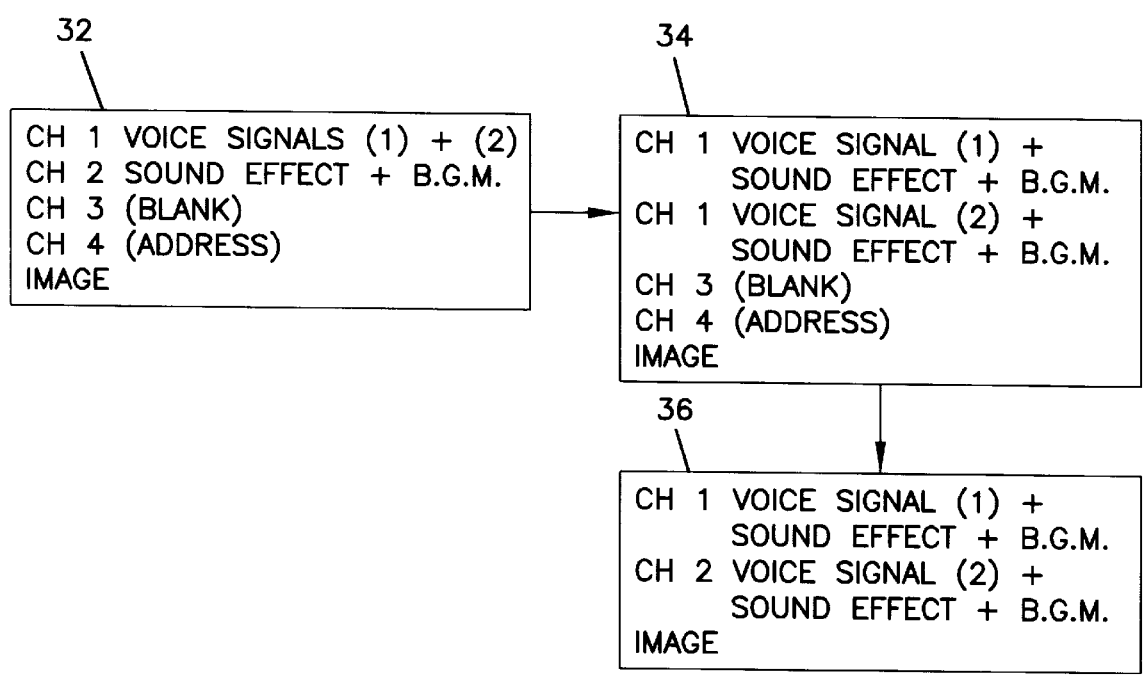
FIG. 2 is an explanatory drawing which shows how the tape is edited.

It is also possible to connect to the video-player 2 as an option an adapter 11 which can be used to insert subtitles on to the playback screen of the monitor television 2. This is not needed if subtitles have already been recorded on to the magnetic tape 3 because there is a playback device 12 as illustrated in FIG. 1. It should be added that, as will be explained later, it is also possible to have the subtitles to the sound signal which was not selected (i.e. is turned off) appear on the screen, and to turn off the subtitles to the selected sound signal. It is also possible to turn off one of the characters on the screen as required. To explain the tape cassette 4 in greater detail, a 11, video tape of the sort used in broadcasting stations is used as the master tape on to which the sound signals (1) and (2) are recorded as CH1, while special effects and background music are recorded on to CH2. CH3 is left blank so that the user can record signals at will, while CH4 is used for the recording of address signals. Image signals are recorded on to the prescribed track.

This master tape is processed (edited) in the following manner. In a first editing operation, the sound signals (1) and (2) are recorded on to CH1 and CH2 respectively, and the same special effects and background music are recorded on to each channel at the same time. The sound signals (1) and (2) are recorded together with image signals on to commercially available tape (½" VHS, Beta, 8 mm etc.) for use in English conversation practice. As is illustrated in FIG. 1, a man's voice A is recorded on to the tape as sound signal (1), and a woman's voice B as sound signal (2), while a film or other production is recorded as the image signal.

There now follows a description of a method of practicing English (or other language) conversation using the above tape. First, the tape cassette 4 is inserted into the video-player 2, and the playback button depressed or the command to play back given by means of the remote controller 7.

Figure 3:
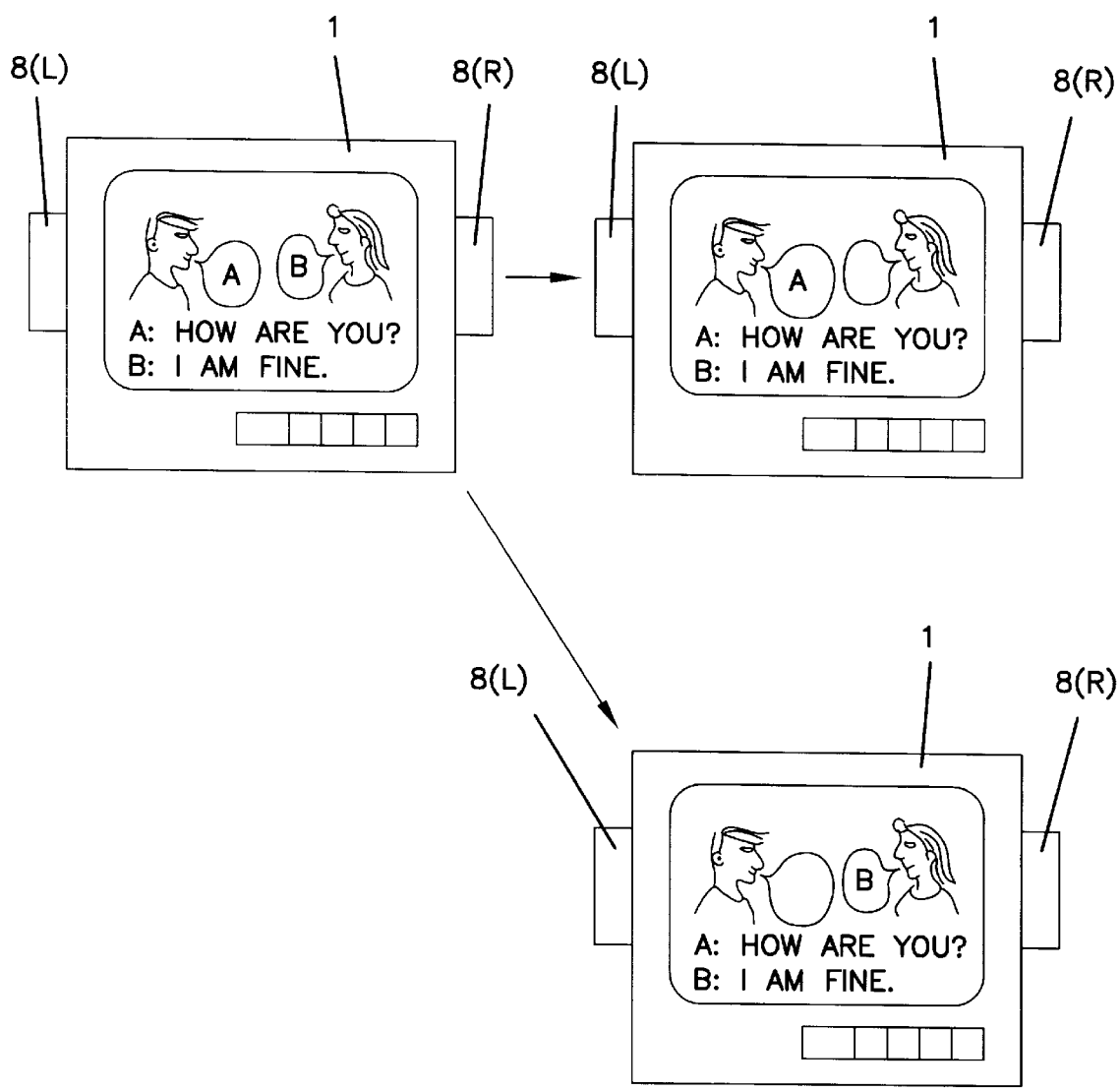
FIG. 3 is a front view of the monitor television showing how English conversation is practiced.

As FIG. 3 shows, the first lesson is played back on the monitor television: a man's voice A from sound signal (1) and a woman's voice B from signal (2) are heard alternately, while images of each of them are seen. Thus, it is possible to listen to the man's voice B from the left-hand speaker 8 (L) and the woman's voice B from the right-hand speaker 8 (R) while watching the television screen. It is also possible to show subtitles corresponding to A and B.

Next, the tape is wound back, and the voice switches on the videoplayer 2 are operated so that CH2 for example is turned off while CH1 is selected. (In this case, channel selection on the monitor television is performed simultaneously.) This can be achieved either by direct operation of the switches on the video-player, or by means of the remote controller 7.

Selecting channels in this manner causes only the sound signal (1) on CH1 to be played back as voice next time the tape is played back: the man's voice A is heard from the left-hand speaker 8 (L), while the woman's voice B is turned off (cf. FIG. 3). In this manner the operator or learner can practice speaking the part of the woman's voice B, which cannot be heard from the right-hand speaker 8 (B), by listening to the man's voice and replying after it. It is possible to check in the following manner to see whether the words uttered by the operator were pronounced correctly or not.

In other words, as is shown in FIG. 3, it is possible to check whether the utterance was correct or not by looking at the subtitles for voices A and B. However, it is difficult to tell at that stage whether the pronunciation was correct or not. Therefore, if the tape is wound back again and played once more selecting CH2 as well this time, the woman's voice B can be heard, making it possible to check whether the utterance was pronounced correctly or not. When one lesson is over, the tape is wound on and the next lesson implemented in the same fashion as above. In this manner it is possible to practice and improve the level of competence of English (or other language) conversation.

It should be pointed out that during the above playback operation when voices A and B are selected, the special effects and background music are left audible. The selection of voices A and B may be implemented as described above, or the remote controller may be used. It is also possible in the same manner to select the voice playback speed at will in the form of slow mode (for beginners) and normal mode (for intermediate level and above). A separate operation from the above allows only CH2 to be selected at the second playback, as is shown in FIG. 3. In this case the man's voice A is turned off and only the woman's voice B is audible. The learner can practice speaking the man's part with the correct timing by watching the playback screen.

In this manner, the English (or other language) conversation practice device to which the above embodiment pertains allows the user, while watching the television screen, to speak to the selected voice (in the form of either an answer or a question) the part of the character which has been selectively turned off, and to check his pronunciation with the subtitle or voice playback simultaneously or successively. It also allows the user to hear music all the time while operating the device. This means that it is possible to learn a language enjoyably and effectively with a presence which allows the user to assume the parts of the characters on the screen, while at the same time watching attractive images and listening to music.

Figure 4:
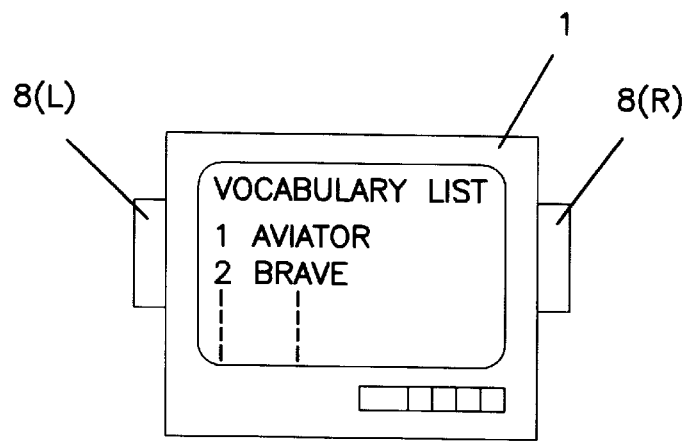
FIG. 4 is a front view of the monitor television showing a list of words on the screen.

Moreover, it is even more effective acoustically if the pronunciation of the user can be heard through the speaker via the microphone 9 illustrated in FIG. 5. FIG. 4 demonstrates how a list of vocabulary items used in the conversation can be show on the screen after the first playback as in FIG. 3. The above operation (e.g. that of turning voice B off) can be implemented after looking at this list for a specified length of time. However, a list of this kind is not essential.

English (or other language) conversation practice as described above may be performed by the individual at home, but it is also possible for a plurality of persons to operate the device in turn. It goes without saying that it can also be used in schools and elsewhere.

The microphone 9 and speakers 10 function effectively with the monitor television 1. In other words, as may be seen from FIG. 6, the first mixer MIX (A) and the second mixer MIX (B) have input portions 20, 21 and output portions 22, 23 which correspond to the first sound channel CH1 and the second sound channel CH2 respectively. The input portions 20, 21 themselves are connected to one another, and the connection is further connected by way of a cable 26 to the main audio-visual player, which may be the above video-player 2 or a personal computer (not shown in the drawings) which controls this. The output 22 of the first mixer MIX (A) is connected to the voice output portion of the monitor television 1, while the output 23 of the second mixer MIX (B) is connected to the speakers 25 with attached microphone (headphone-speakers) worn by the operator 24. The structure is such that the input sound signal of the speakers 25 with attached microphone is input to the first mixer MIX (A), and the voice which has been turned off (e.g. CH1) is audible only to the operator through the speakers 25 with attached microphone. Instead of the voice which has been turned off, the audience other than the operator 24 hear the voice of the operator 24 input through the speakers 25 with attached microphone.

Thus, in language learning as described above, the sound channel CH1 which has been turned off is inaudible to the audience but audible to the operator, who is able to input his own utterance into the sound channel so that the audience can hear it. This allows language practice to be performed effectively, while giving the learner (operator) the chance to have his pronunciation evaluated by the audience, the cumulative effect being advantageous for progress in language studies.

Figure 7:
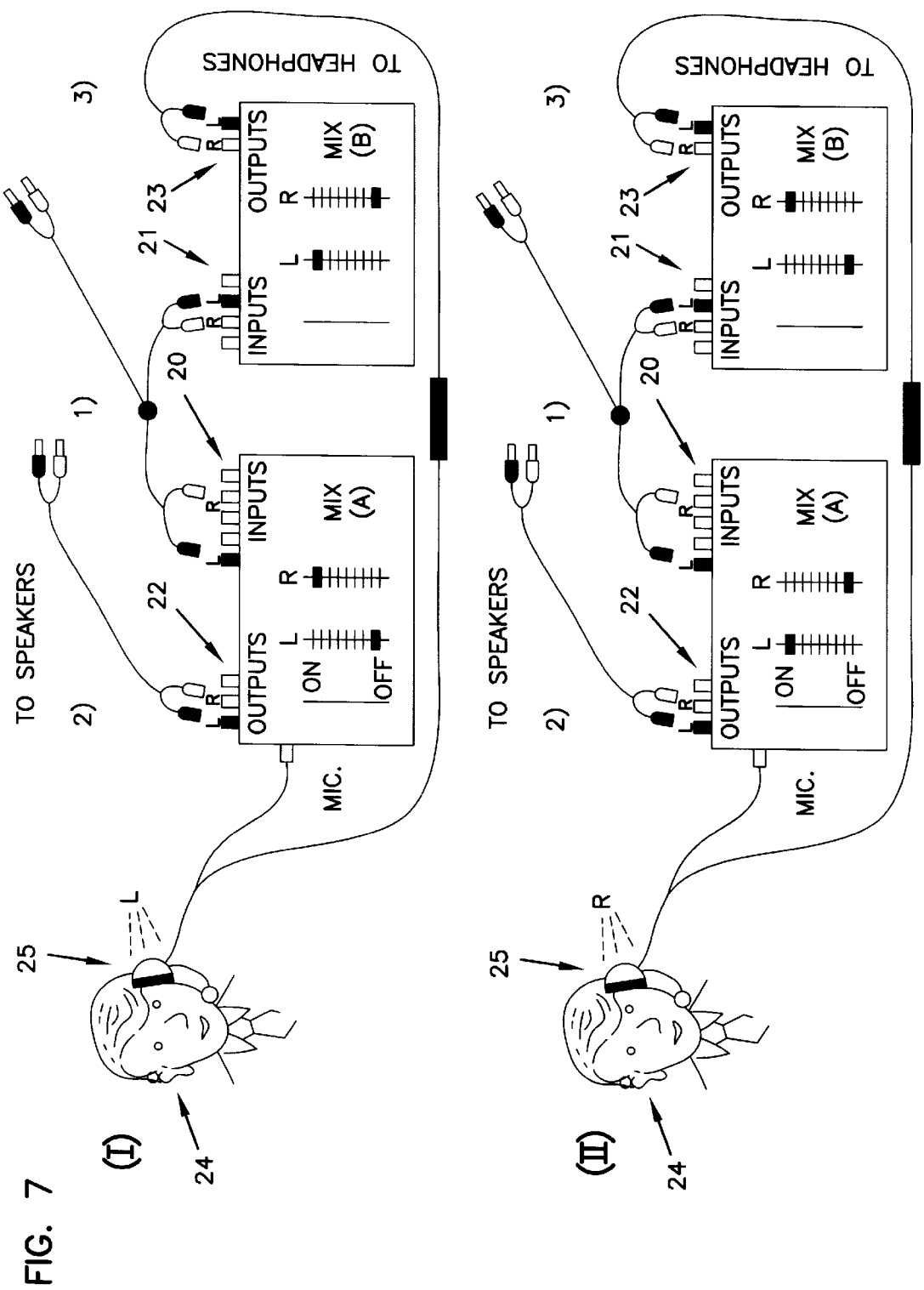
FIG. 7 is an outline drawing of the same part of the mixer in operation.

For example, as shown in FIG. 7, the mixer MIX (A) mixes the sound channel switch and input voice of the operator with the video side, while the mixer MIX (B) searches and plays back the sound channel which has been turned off. In the drawing, the speakers on the operator side have been depicted in outline.

For instance, during hi-fi operation both L and R channel levers of the mixer MIX (A) are on, but either channel can be turned off by pressing the relevant lever upwards.

If as in FIG. 7 (I) the lever L of the mixer MIX (A) is off and the lever R on, while the lever L of the mixer MIX (B) is on and the lever R off, only the voice of the L side channel is audible to the operator through the speakers 25. The opposite operation is illustrated in FIG. 7 (II).

The above is a description of an embodiment of the present invention, and is capable of further modification on the basis of the technical concept of the present invention.

For instance, in the above example a man's voice A and a woman's voice B were played back, but uses with various different voices are of course feasible. It is also possible to practice by turning both the man's voice A and the woman's voice B off.

Moreover, it is possible in the above example to provide some sort of display so as to make the operator aware of the length of time the voice is turned off (i.e. the timing of the pronunciation practice). It is not essential for subtitles to appear on the screen. This may be applied to use with magnetic tapes, Beta tapes and 8 mm film. It is also feasible to connect a personal computer to the videoplayer, and to practice with the aid of software programs set in advance in the computer. For example, signals for the selection of sound channels and the procedure for tape playback may be built into the software program, so that the above operations can be performed automatically.

Moreover, it is possible to provide applications for playing music video on the magnetic tape, in which case for instance CH1 is used for either of sound signal (1) or sound signal (2) with the background music having recording music and special effects, while CH2 is used for the background music. As a music tape it is also possible to use CH1 and CH2, recording the voice (sound) of a singer on CH1 and turning the sound off as required to allow only CH2 to play back, thus facilitating use as a type of karaoke tape. In such a case, the user can imitate the pronunciation and other aspects of the singer while listening to the music, and can enjoy pretending to be a singer and practicing music at the same time as learning a language. In this manner it is possible, if a video tape can provide three or more sound channels, to widen the range of application of the above English (or other language) conversation practice. It goes without saying that CH1 and CH2 may be selected, but it is also possible to select CH2 and CH3. According to the number of channels it is possible to use one tape both for practicing English (or other language) conversation and for karaoke. The present invention can, of course, be applied to learning activities other than language. Moreover, other storage medium such as CDs may be also applied instead of the video tape or the video player.

According to a second example embodiment of the present invention, instead of employing video tapes, systems, devices and methods employ video CDs (for music video) which are capable of playing back moving pictures, and wherein a switch is provided with permits the simple alteration of uttered sounds.

Figure 8:
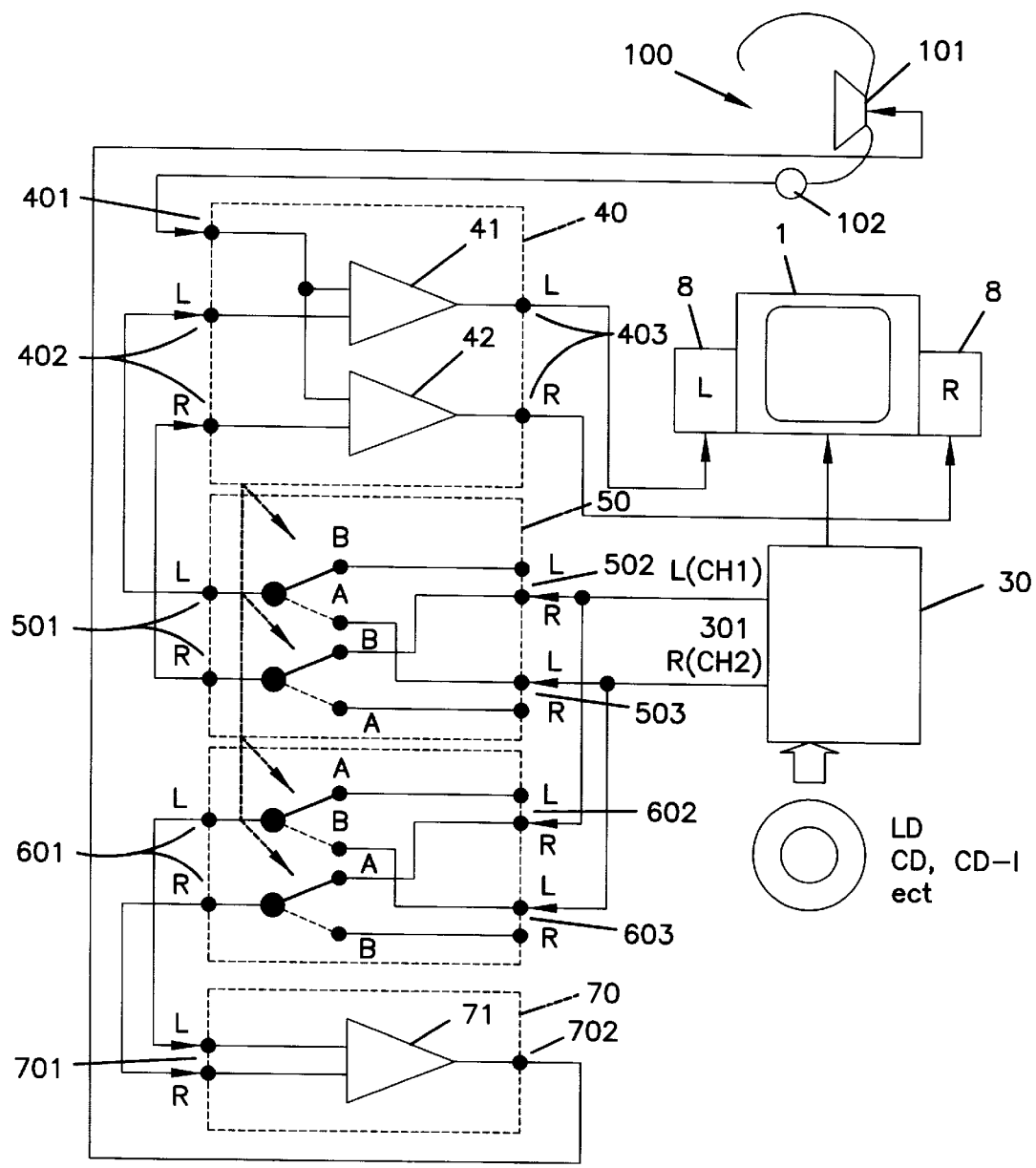
FIG. 8 is a block drawing of the video pronunciation practice device to which Embodiment 2 pertains.

FIG. 8 is a block diagram of the pronunciation practice device according to the second example embodiment. It has a headset 100, a microphone mixer 40, a switch 50, a switch 60, and an amplifier 70. It also has a commercially available monitor device 1, speakers 8 (L) (R), and CD player 30.

Figure 9:
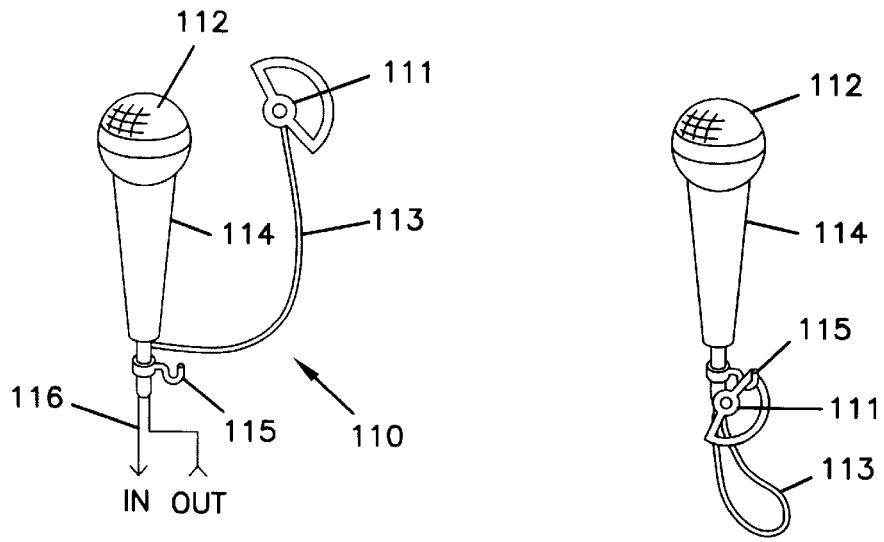
FIGS. 9a–c are a drawing showing modifications of the headset.
Figure 9:
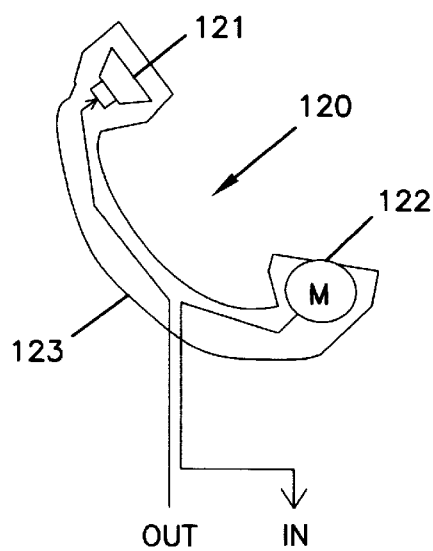

The headset 100 is the same as the headset 25 used in the first example embodiment, and is provided with a headphone 101 which feed sound to the user individually, and a microphone 102 which changes the user's voice into a sound signal. The headset may be modified in a number of ways. For instance, the headset may also assume the form of a microphone with an earphone as illustrated in FIG. 9(a) and (b). In this case, a microphone 112 and a hook 115 are provided on a part of body 114. A cord 116 is connected to the body 114, while an earphone 111 is connected to a cable 113 which is connected to the connection between the cord 116 and the body 114. Use of this microphone set 110 with earphone, as may be seen from FIG. 9(a), allows the user to play sound back with the body 114 in his hand and the earphone 111 at his ear. If the user does not need to play sound back, the user can place the earphone 111 on the hook 115 as illustrated in FIG. 9(b). In this way the user can operate the microphone with ease and hear sound accurately.

Figure 10:
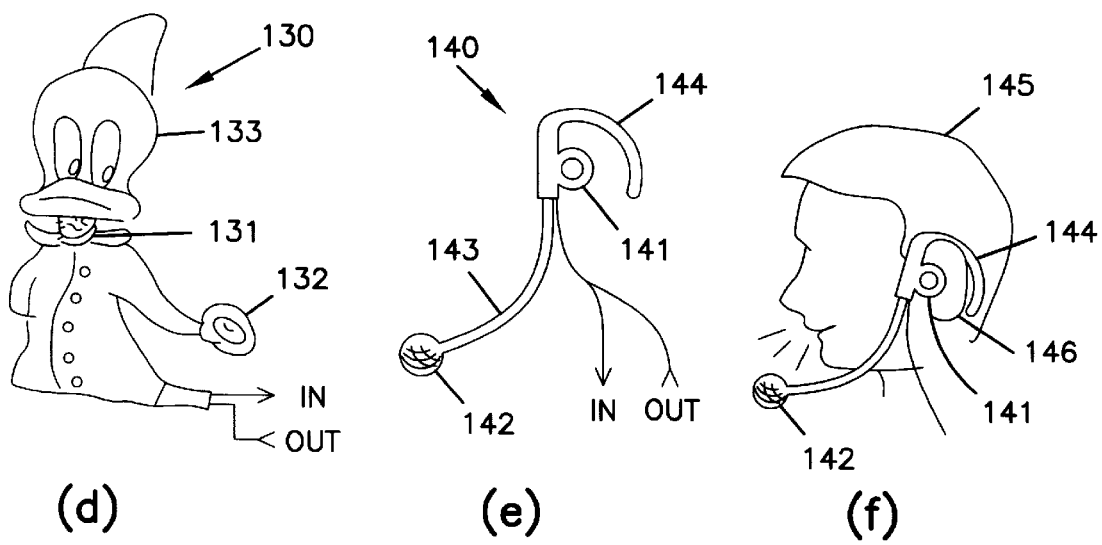
FIGS. 10d–g are a drawing showing modifications of the headset.
Figure 10:
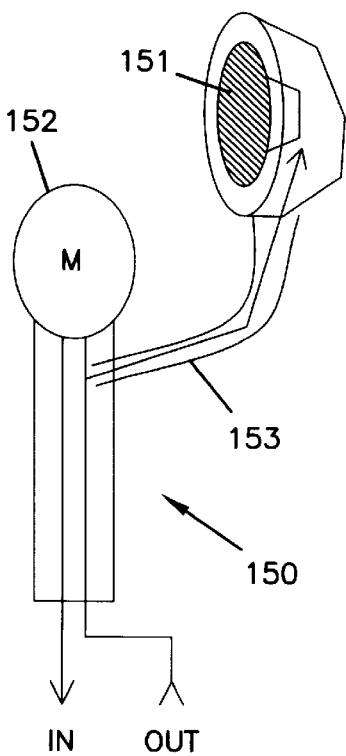

Moreover, the headset may be the set 120 illustrated in FIG. 9(c), where a speaker 121 and a microphone 122 are provided on a receiver-like body 123. This shape can be given a high degree of mechanical strength and is very safe, so that it is suitable for use as a pronunciation practice device set for children. Furthermore, the receiver-like body may be shaped in a character, as illustrated in FIG. 10(d), such as a television hero who is popular among children. The set 130 like this, which has a microphone 131, a speaker 132 and a character-shaped body 133, can amuse children who are playing the set.

Alternatively, the microphone set may be shaped as shown at 140 in FIGS. 10(e) and (f), in which a microphone 142 is connected to a earphone 141, which has an ear hook 144, by an arm 143. When a user 145 hooks the ear hook 144 on his ear 146 as illustrated in FIG. 10(f), the earphone 141 is in a position of his ear, and can thus feed sound individually to the user.

Alternatively, the microphone set may be shaped as shown at 150 illustrated in FIG. 10(g), in which a speaker 151 is held on to a microphone 152 by means of a support 153. when the user grasps the microphone 152, the speaker 151 is in a position in the vicinity of the user's ear, and can thus feed sound individually to the user. It differs from the above headset in that it is easy to manipulate and remains clean because it is not worn.

The microphone mixer 40 has a microphone input terminal 401 with an input impedance matching the output impedance of the microphone 102, a line input terminal 402 and an output terminal 403. The microphone mixer 40 is structured in such a manner as to be able to synthesize the sound signal fed to the microphone input terminal 401 and that fed to the line input terminal 402, amplify them, and output them to the output terminal 403.

The switch 50 has an output terminal 501, an input terminal 502 and an input terminal 503. It is structured in such a manner that in response to the pressing of an operational button either the input terminal 502 or the input terminal 503 can be connected to the output terminal 501.

The switch 60 has an output terminal 601, an input terminal 602 and an input terminal 603. It is structured in such a manner that in response to the pressing of an operational button either the input terminal 602 or the input terminal 603 can be connected to the output terminal 601. The switches 50 and 60 are linked so that if A is selected, the input terminals 503 and 602 are chosen, while of B is selected, the input terminals 502 and 603 are chosen.

It should be added that the switches 50 and 60 may be provided with an operational (reset) button which breaks the connection. If the user wishes to halt his pronunciation practice, he can interrupt the sound by depressing this operational button. The amplifier 70 is structured in such a manner that the sound signal from the output terminal 601 of the switch 60 can be amplified and fed to the headphone 101 of the headset 100. The monitor 1 and speaker 8 used are the same as those in the first example embodiment, except that the L channel and R channel of the output terminal 403 of the mixer 40 are connected respectively to the speakers 8 (L) and 8 (R). The image output signal of the CD player 30 is input to the image input terminal of the monitor device 1.

The CD player 30 has the function to play back CDs of video CD format, and is structured in such a manner that it can output an image signal, left-hand sound signal (L: channel 1) and right-hand sound signal (R: channel 2). The CD player 30 may be able to decode image signals of video CD format, i.e. MPEG1 standard digital data, and output them as image signals and two-channel sound signals. Apart from a CD player, it is feasible to utilize a personal computer or other device which is capable of outputting image signals and sound signals corresponding to video CD format. Moreover, although a video CD is used here, it is also possible to use a playback device for another storage format, such as devices for playing back video tapes, laser tapes, laser discs or CD-Is, provided that they are capable of outputting image signals and two channels of video signals.

The present embodiment employs a characteristic method of connecting the CD player with the switches 50 and 60. To connect the two it is preferable to use a special cable which allows one stereo sound output to be partitioned into two stereo outputs. The L channel of the CD player 30 is connected to the input terminal 502 (R) of the switch 50 and the input terminal 602 (R) of the switch 60. Meanwhile, the R channel of the CD player 30 is connected to the input terminal 503 (L) of the switch 50 and the input terminal 603 (L) of the switch 60.

Furthermore, the above embodiment is structured in such a manner that if a plurality of users are to practice singing their own parts simultaneously, the output of the output terminal 501 of the switch 50 can be amplified by means of another amplifier and feed a speaker located in the headset of another user. The structure is such that the microphone mixer 40 synthesizes the sound signals fed from the microphones of the two users and the sound output from the CD player 30, feeding them to the speaker 8. A structure of this sort allows each user to be provided through his headset with the voice of the notes which he is to sing, while the singing voice of each user is synthesized with the accompaniment on the CD and output through the speakers.

It is also possible, by adapting a normal karaoke scoring device to the sound output signal of the microphone mixer 40, to structure the present embodiment in such a manner that it is possible to mark the singing of the user.

The video CD which forms the storage medium is a music or karaoke CD corresponding to CD-ROM XA specifications. It is structured in such a manner as to be capable of storing control data for interactive processing. If only still images are to be used, a karaoke CD format is adopted. This comprises still image data, lyric data, karaoke information and other data. If the image is to include moving pictures of the singer's performance, BGV and other elements, a video CD format capable of storing moving pictures corresponding to MPEG1 specifications is adopted. on the video CD are stored the background and image signals such as the lyrics of the song which is being performed. The video CD used in the present embodiment in particular is such that duets performed by the interaction of a plurality of parts are selected as the practice area for practicing pronunciation. The sound signals are stored on separate channels as shown in Table 1.

TABLE 1

|  | Channel 1 (L) | Channel 2 (R) |
|---|---|---|
| Normal storage area | Stereo left sound | Stereo right sound |
| Practice area | Voice of part A | Voice of part B |

The practice area is set during authoring of the video CD by selecting duets and similar pieces which can be divided into a plurality of parts for singing. In the practice area, the sound is extracted part by part from the original stereo sound and stored by allocating the parts to the left and right channels in accordance with Table 1. The accompaniment and other background music is stored together with both parts. It is also possible to set a piece sung by only one singer, in which case it is also possible to allocate the voice of the singer as part A and the accompaniment as part B. When a song has one singing part, it is also possible to allocate the channel 1 (or channel 2) as the sound parts and BGM, while the channel 2 (or channel 1) as BGM only, so that it is used as a normal karaoke machine for one person.

It should be added that if the CD player 30 has a playback control function, the control data for performing this playback control function may also be stored on the video CD. The control data for use with playback control can be stored for example on track 1 immediately after the lead-in area, and comprises data for the purpose of displaying menu screen or jumping to a scene selected from that menu screen. If the CD player has a "select" key, an "enter" key or other simple button, it is possible by depressing this button to refer to this control data and replay a desired scene. This function will be described in greater detail with respect to the third example embodiment.

The present embodiment is structured in such a manner that if the video CD has a subtitle select/display function, it is possible by operating the CD player 30 to turn off the lyrics of either part A or part B. Details of the subtitle select/display function are given with respect to the third example. If the video CD has no subtitle select/display function, it is possible to utilize an adapter for subtitles as was explained in relation to the first example embodiment.

With the above structure, the user puts a video CD recorded according to a format as described herein on to the CD player 30. Here it will be assumed that a duet has been selected by the user, and the practice area is played back. The sound signal of part A is output to channel 1 of the CD player 30, while that of part B is output to channel 2.

If the user wishes to practice the pronunciation of part A, he selects A on the linked switch 50/60. The switch 50 selects the sound signal for part B and outputs it to the microphone mixer 40. The switch 60 selects the sound signal for part A on channel 1 and feeds it via the amplifier 70 to the headphone 101 in the headset 100 which the user is using. The user is able to sing part A while listening to the sound of part A and referring to the lyrics which are displayed on the monitor 1. The sounds uttered by the user are fed from the microphone 102 to the microphone mixer 40, where they are synthesized with the sound signal of part B and fed to the speaker 8. The audience listen to the user's song while watching the lyrics displayed on the monitor 1, and are able to check whether the pronunciation is correct or not.

Next, if the user wishes to practice the pronunciation of part B, he selects B on the linked switch 50/60. The switch 50 selects the sound signal for part B and outputs it to the microphone mixer 40. The switch 50 selects the sound signal for part A on channel 1 and outputs it to the microphone mixer 40. The switch 60 selects the sound signal for part B on channel 2, and feeds it via the amplifier 70 to the headphone 101 in the headset 100 which the user is using. The user is able to sing part B while listening to the sound of part B and referring to the lyrics which are displayed on the monitor 1. The sounds uttered by the user are fed from the microphone 102 to the microphone mixer 40, where they are synthesized with the sound signal of part A and fed to the speaker 8. The audience listen to the user's song while watching the lyrics displayed on the monitor 1, and are able to check whether the pronunciation is correct or not.

As has been explained above, the second example embodiment allows the user to switch simply, by just operating a switch, to the part for which he wishes to practice the pronunciation.

Even with a storage medium for use with music, the present pronunciation practice device can also be used for practicing pronunciation in musical performances, which is to say practicing songs, by adapting the recording format of the present device in that area.

It is also possible to prepare a plurality of headsets so that a plurality of users can practice the pronunciation of different parts simultaneously. It goes without saying that this can be applied not only to songs but to practicing instrumental performance by allocating instruments to part A or part B and using a microphone designed for use with musical instruments.

Figure 11:
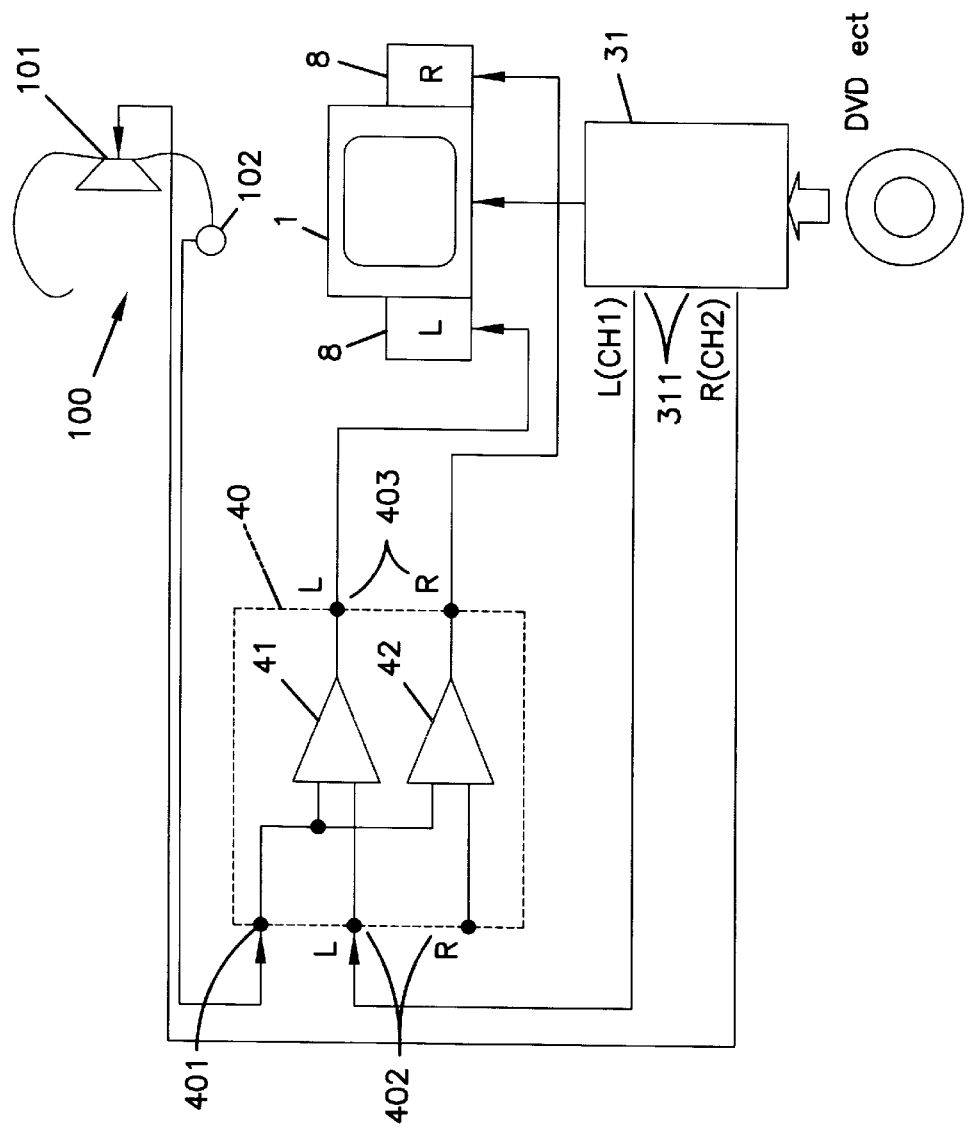
FIG. 11 is a block drawing of the video pronunciation practice device to which Embodiment 3 pertains.

A third example embodiment of the present invention relates to a pronunciation practice device which is suited to a multi-channel storage medium such as a DVD rather than a storage medium where the sound channels are restricted as in the embodiments described above. FIG. 11 is a block diagram of the pronunciation practice device to which the third example embodiment pertains. The present pronunciation practice device has a headset 100, a monitor device 1, speakers 8 (L) and (R), a DVD player 31 and a microphone mixer 40. The headset 100, a monitor device 1, speakers 8 (L) and (R) and microphone mixer 40 are structured in the same manner as in the above embodiment, and a description will be omitted here. The same is true of modifications.

The DVD player 31 is capable of playing back DVDS, which is to say storage media stored in a DVD format. A computer which can playback DVDs is also usable as the DVD player of this embodiments This DVD player 31 is able to output image signals and two channels of sound signals (channels 1 and 2). A particular characteristic of the DVD player 31 is that it is capable of selecting and outputting from among a plurality of sound channels housed on a DVD one sound channel determined on the basis of control data stored on the DVD or a command from the user. Each channel has allocated to it right and left stereo signals. With regard to subtitles also, it is possible to store a plurality of subtitle data (e.g. in the mother language and a plurality of foreign languages) on the DVD, and for the DVD player to superimpose the on the image by selecting one of this plurality of subtitle data on the basis of control data stored on the DVD or a command from the user. Moreover, the DVD player 31 can at the touch of a button on the device or on a remote controller be made to display a menu screen and to select one of the plurality of subtitle and sound channels.

Of the sound output terminals 311 of the DVD player 31, channel 1 is connected to the L channel of line input terminals 402 of the microphone mixer 40, while channel 2 is connected to the headphone 101 of the headset 100. The sound signal of the microphone 102 of the headset 100 is fed to the microphone input terminal of the microphone mixer 40. A cable connects the DVD player 31 and the microphone mixer 40. The DVD player 31 and the headphone 101 are connected for instance by fitting an adaptor to the headphone terminal of the DVD player in order to change the stereo sound into left and right monaural sound, and feeding the right-hand sound only via a minijack to the headphone 101.

It is also possible to endow the DVD player 31 or the speaker 8 with the function of a microphone mixer, or in other words to subsume the microphone mixer within the device in advance. In this case, the microphone 102 is connected directly to the DVD player or the speaker 8. The DVD player or the speaker may also be structured in such a manner that it is able to synthesize and output the sound signal from the microphone and the sound signal originally played back from the DVD.

Moreover, it is also possible to endow the speaker 8 with the function of a microphone mixer, or in other words to subsume the microphone mixer within the speaker in advance. In this case, the microphone 102 is connected directly to the speaker. The DVD player may also be structured in such a manner that it is able to synthesize and output the sound signal from the microphone and the sound signal originally played back provided from the DVD.

Furthermore, it is possible to connect a sound analysis device to the output of the microphone mixer in order to evaluate the user's pronunciation. For example, it may be structured in such a manner that the sound signal is input to a computer, where a pronunciation evaluation program is implemented. If the DVD player 31 is assumed as the computer which comprises a circuit like the mixer 40, the computer can evaluate the user's pronunciation by executing a program for evaluation.

The DVD which forms the storage medium preferably stores high-quality image and sound data by means of compression in accordance with MPEG2 specifications. In particular, because they are for multimedia use, DVDs are provided with a plurality of subtitle channels on which it is possible to display a plurality of types of subtitle. They also have a plurality of sound channels so as to be able to handle a plurality of languages. They are able to have sound channels for multilingual use, and five sound channels with low range emphasis channels corresponding to Dolby AC-3 specifications.

Table 2 shows an example configuration of the above subtitle and sound channels in the DVD to which the present embodiment pertains.

TABLE 2

| Name of Channel | Subtitle channel | Sound channel | |
|---|---|---|---|
| | | L sound | R sound |
| Channel 1 | English (all characters) | English (original: stereo) | |
| Channel 2 | English (character A) | English (character A) | English (character B) |
| Channel 3 | English (character B) | English (character B) | English (character A) |
| Channel 4 | Japanese (all characters) | Japanese (voice-over: stereo) | |
| Channel 5 | Japanese (character A) | Japanese (character A) | Japanese (character B) |
| Channel 6 | Japanese (character B) | Japanese (character B) | Japanese (character A) |

Channels 2 and 3 are for the sake of Japanese who wish to practice English pronunciation, while channels 5 and 6 are for the sake of non-Japanese who wish to study Japanese. Background noises and special effects are recorded on each of the channels 2, 3, 5 and 6 as well as channels 1 and 4.

Figure 12:
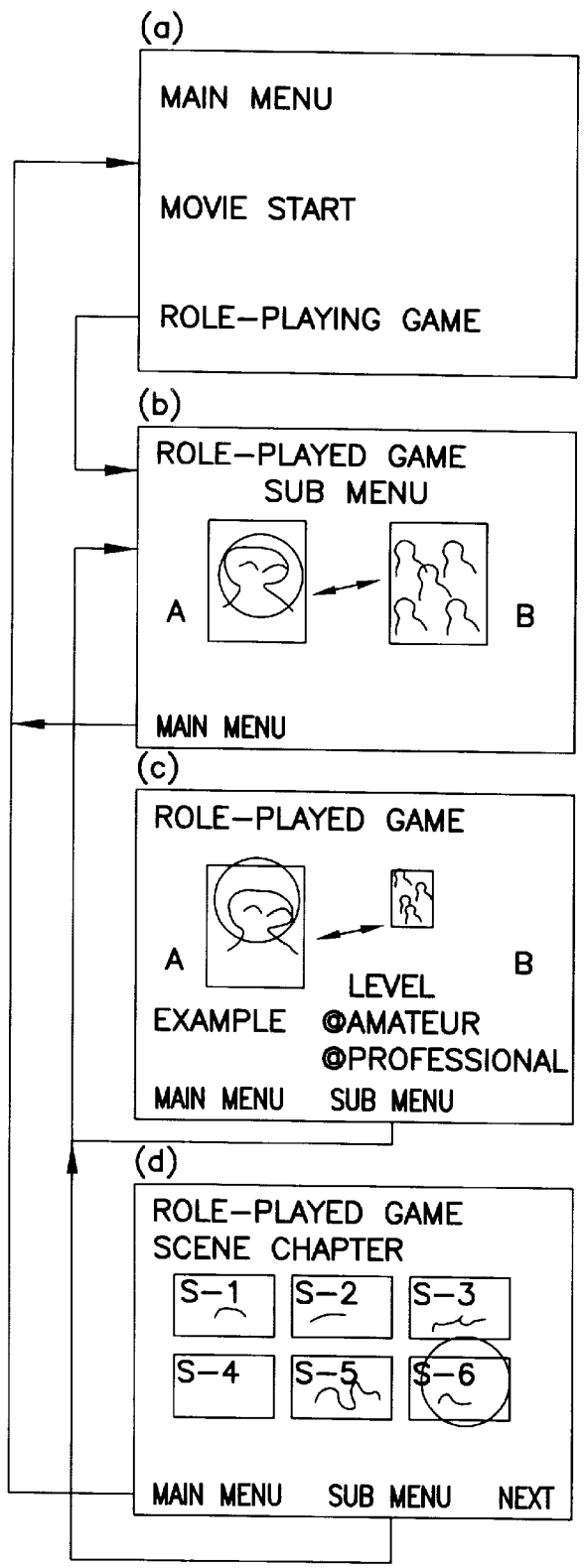
FIG. 12 is a drawing which explains the action of the playback control in Embodiment 3.

Apart from the above subtitle and sound data, control data for use in pronunciation practice are stored in the control data storage area of the DVD to which the present embodiment pertains. This control data is structured in such a manner as to enable the pronunciation practice function of the present invention to be provided in the form of a role playing game. The control data storage area is recorded for instance on track 1 immediately after the lead-in area of the DVD. On track 1 are stored normal PVD, karaoke data, disc data, list ID offset table, playback control data, segment play data and the like. The list ID offset table houses a list of playback procedures. Segment play data includes still data (c–f. FIG. 12) for use in menus for selecting role playing game or movie modes and sound or subtitle. Playback control data includes scene jumping data for use in role-playing games, together with subtitle and sound channel information for use at such times. Thus, sound signals need to be stored in channels 2, 3, 5 and 6 at least for scenes where role-playing games are enacted.

The DVD is set so that selection of movie mode, which is the normal mode for playing movies, allows either channel 1 of channel 4 to be selected. on the other hand, selection of role-playing game mode allows channels 2, 3, 5 or 6 to be selected. For instance, if the recorded content is a foreign film for a Japanese audience, sound channel 1 and subtitle channel 4 are selected as the default in movie mode. In role-playing game mode, either channel 2 or channel 3, both of the sounds and subtitles, is selected according to the user's designation. Channel 2 is selected if the user specifies pronunciation practice with character A, channel 3 if he specifies pronunciation practice with character B.

There follows a description of the action of the pronunciation practice device using a DVD to which the present embodiment pertains. First it is assumed that the user has placed the DVD on the DVD player 31 and given instructions for playback. If the normal "play" button is depressed, playback will be in movie mode. Instead, the user presses the "menu" button on the remote controller or other control device. Reference to the segment play data housed on track I of the DVD causes a main menu like the one illustrated in FIG. 12(a) to be displayed.

Moving the cursor to "movie start" and depressing the "enter" key (this action will be referred to hereinafter as "selecting") allows movie mode to be selected. If this is done, the film will be played back from the start in the normal manner. That is to say, channel 4 will be selected as the subtitle, and Japanese subtitles will be displayed, while channel 1 will be selected as voice and the original soundtrack will be played back.

However, it is also possible to give sub-menu data and display a sub-menu which allows sound selection, subtitle selection and important phrases which are convenient in language learning. It is possible to structure the present embodiment so that it displays a sub-menu which makes it possible to jump to a particularly memorable scene. In important phrases replay mode, for instance, channel 1 can be selected as subtitle, and a caption is displayed in the original language, while channel 4 can be selected as voice and the Japanese voice is played back.

Selecting role-playing games in the main menu (FIG. 12(a)) causes a sub-menu to be displayed as shown in FIG. 12(b). Here it is structured in such a manner that either the hero (character A) or another character (character B) can be selected. If for example the user selects character A, the cursor which is displayed in the selected character lights up a bright red color. Further sub-menu data is read and a label selection menu like the one illustrated in FIG. 12(c) is displayed. Since character A has already been selected, character A is displayed large. In this screen the user selects "example", "amateur" or "professional". More sub-menu data is read and a scene selection menu like the one illustrated in FIG. 12(d) is displayed. when the user selects one of the scenes, playback of the selected scene in the mode selected in the label selection menu commences. In other words, the control data which designates the subtitle and sound channels on the basis of the label selection menu is referred to, followed by the control data which designates the jump destination address of the scene selected in the scene selection menu. It is set to return to the sub-menu when the role-playing game is over.

Selecting "example" causes sample playback mode to be entered. In this mode, channel 2 is selected as subtitle data (channel 3 if character B has been selected), and channel 1 is selected as sound data. Thus, the user can prepare while watching the subtitles of character A (or character B) engaged in pronunciation practice and referring to the conversation spoken in the original language. Selecting "amateur", or "professional" causes the role-playing game to be implemented. In this mode, channel 2 is selected as subtitle data (channel 3 if character B has been selected). In this mode the subtitles of the character which has been selected for pronunciation practice are displayed, and voice is output from the L channel, while the voice of characters other than the one selected is output from the R channel. The user can imitate the voice of the character which he himself is pronouncing as it is heard from the headphone 101 of the headset, and can practice pronunciation into the microphone 102 while referring to the subtitles. The voice uttered by the user are synthesized with the voices of the characters other than the one which has been selected, and are provided to the audience through the speakers B. The audience is presented with the user's pronunciation instead of the voice of the character which has been selected, and can evaluate the user's pronunciation as if he were speaking to the other characters.

If "amateur" is selected, the scene is played back in slow mode. If this mode is selected, the speed of the conversation is slower, and it is thus possible to provide a game where it is easy for the user to pronounce and suitable for beginners. The sound signal created for this mode is compressed (for a detailed explanation see below) during authoring, and processed in such a manner that while the speed of the conversation is slower than normal, the height of the sound is no different from the original. Thus, there is a sound channel for storing sound signals for slow mode. If "professional" is selected, playback is at normal speed. Because it is normal speed, it is the everyday conversational speed of native speakers, and thus it is possible to provide a game which is worthwhile for intermediate and advanced students to try their hand at.

If the DVD player is facilitated with repeat function, the user can use the function in the role-playing game mode. When user instructs the DVD player to repeat some phrase in the practice area, the user can pronounce the phrase repeatedly for more practice.

The following is a brief description of example procedures which may be used in creating a DVD to which embodiments of the present embodiment pertain. This DVD is created in an encoding/authoring studio using a computer which is capable of running dedicated application software.

(1) Moving Picture Data

A computer running editing software is used to put moving picture data on the disc by designating with time codes the beginning and end of the area which it is desired to digitalize from among image signals recorded on a digital beta cam tape or beta cam tape. The signals are then digitalized.

(2) Sound Signal

A computer running editing software is used to put sound signal data on the disc by designating with time codes the beginning and end of the area which it is desired to digitalize from among sound signals recorded on the same tape. The signals are then digitalized.

(3) Subtitle Data

Subtitle data is put on the disc by creating it on a computer and designating the end with a time code in order to match it to the corresponding image.

(4) Chapter, Scene and other Still Data

The part which it is desired to make into a still is found by replaying the tape, and a memo inserted in the form of a time code. The image designated by the time code is changed into a digital signal on a computer running video capture software, and rendered into still data.

(5) Menu and Sub-menu Still Data

The menu and sub-menu screens are created according to specifications on a computer running image creation software. Chapter, scene and other still data created in (4) are then inserted into the menu screen and sub-menu screen while designating and adapting their size and position, thus creating still data. The output size is for instance 720 dots x 480 dots.

(6) Creating DVD Data

The above still data and moving picture data stored on the disc is edited using a computer running dedicated authoring software.

First, the moving picture data is laid out in order and edited. The sound and subtitle signals corresponding to each sound and subtitle channel are made to correspond with the moving picture data and designated in ascending order of channel number. Data which is to be used in slow mode is created in the following manner. In the case of moving picture data, this is achieved by gradually lengthening the interval at which the frames change. For example, if the speed at which the frames change is reduced to ⅓ what it normally is during playback, the playback speed can also be reduced to ⅓. However, simply slowing down the playback speed of sound signals lowers the sound frequency, and the result is unnatural. Thus, a sound compressor is used to compensate the lowered sound frequency and bring it close to the original sound. To be more precise, the PCM data is compensated so as to assume the same frequency as the original. The compensated PCM data is divided into short intervals, and the data for one interval repeated a prescribed number of times to create a single piece of sound data, after which the sound signal is stretched to the same length as if it were really being spoken slowly. In other words, the lowered sound is played back quickly to return it to its original height. Then the same sound is caused to be repeated a plurality of times at a very short cycle, and the playback time is adjusted to the same length as the slow mode image display time. once the sound signal is complete, it is synchronized with the slow mode image signal, and written back on to the disc in the editing computer.

(7) Creating Data for use in Playback Control

Next, the data for use in playback control is created. For example, the relationship between the interactive menu and moving images is designated on the basis of picture content as illustrated in FIG. 11. In order to designate moving image data, the jump destination is designated with a time code. At the same time the subtitle and sound channels are designated. At this point relationships are determined as shown in Table 2. Next, the menu screen still data created in (5) is read, and linked with the above designated moving image data. When this process is complete, simulation is performed. In other words, the menu is tested to see whether or not it acts as planned without modification to the image data on the disc. If correction is found to be required, it is implemented, and thus data is perfected which can actually be stored on the DVD. This is then changed into data format for recording on the DVD, after which it is put on an emulator and connected to a normal television receiver to test its action.

(8) Creating the DVD

A DVD-R recorder is used to record on to the DVD-R in accordance with the above digital data. Alternatively the digital data is stored on a DLT tape and sent to a press factory.

Table 3 shows another example of sound channels in the DVD which is suitable for music videos.

TABLE 3

| Name of | Sound Channel | |
|---|---|---|
| Channel | L sound | R sound |
| Channel 1 | BGM and Vocal (stereo) | |
| Channel 2 | Vocal + BGM | BGM |
| Channel 3 | BGM | Vocal + BGM |

English, Japanese or any other languages can be set in subtitle channels. When a user selects channel 2, the background music and special effects together with the vocal part which the user intends to sing, is personally provided to the user's ear, while the BGM synthesized with the vocal of the user is fed to the speaker 8. When the user wishes to practice without the guide vocal, the user may select channel 3.

Table 4 shows another example of sound channels in the DVD which is suitable for simultaneously translation mode.

TABLE 4

| Name of | Sound Channel | |
| --- | --- | --- |
| Channel | L sound | R sound |
| Channel 1 | Original language (stereo) | |
| Channel 2 | Japanese | English |
| Channel 3 | English | Japanese |

When English or other original language is spoken in a video, a user can select channel 2, to hear the simultaneously translation in Japanese, and the voice of the translation in Japanese is provided to the user's head set. When Japanese or other original language is spoken in a video, a user can select channel 3 if he wishes to hear the simultaneously translation in English, and the voice of the translation in English is provided to the user's head set.

The third example embodiment as described above allows the user to practice pronunciation while referring to the subtitles of the character he has selected. In particular, the sound of the character of whose lines he is to pronounce is provided separately to the user, allowing him to imitate the pronunciation, and this is effective in correcting pronunciation.

Moreover, the third example embodiment allows the audience to listen to the sound of the user as if it were the sound of the selected character, allowing them to evaluate the pronunciation. In particular, the use of an evaluation device permits objective evaluation of the user's pronunciation, and is effective for pronunciation practice. Furthermore, the use of a multimedia storage medium allows changes in character selection to be designated by remote controller, thus making it easy to change pronunciation parts. Finally, the availability of slow mode on the storage medium means that it is possible to practice pronunciation at a slow speed. Moreover, even at slow sped the height of the sound is as in the original, so that there is no unnaturalness and it is easy to pronounce.

The present invention is in no way restricted to the above embodiments, and is capable of modification in a variety of ways. For instance, the storage medium is not restricted to the above media format, and may be altered. In particular, there is no need for the storage medium to be in a form which is capable of distribution, and it includes supply by data transmission. For example, if it is set up as in the first or second example embodiments, pronunciation practice is feasible by the side of a receiver or computer, and may be implemented by satellite broadcasting, cable television network or various terrestrial forms of data communication provided that it is possible to relay stereo sound.

Moreover, if multichannel transmission is feasible, setting subtitle and sound channels as described with respect to the third example embodiment will allow a variety of pronunciation practice activities to be carried out by the side of a receiver or computer.

Furthermore, the provision of a structure whereby the user's sound can be evaluated with the aid of an evaluation device allows the user to evaluate his own pronunciation objectively, thus rendering pronunciation practice even more effective.

The microphone mixer, switches, amplifier, headset, microphone and other devices may be arranged in any way, by combining two of them into one, or by combining them with the player.

Moreover, sales and other forms of distribution may be implemented by distributing the storage medium together with the microphone mixer, switches, amplifier, headset, microphone and other devices as a set.

As explained above, an English (or other language) conversation practice system, device and method according to embodiments described herein allow pronunciation to be practiced effectively by selecting a first sound signal and a second sound signal from a first sound channel and a second sound channel, turning at least one of the voices from one of the channels off, and processing this voice which has been turned off with the aid of mixers and a speaker with attached microphone. It also allows the user to hear music all the time while operating the device. This means that it is possible to learn a language enjoyably and effectively with a presence which allows him to assume the parts of the characters on the screen, while at the same time watching attractive images and listening to music.

Moreover, preferred embodiments of the present invention enable the user to practice pronunciation effectively by using compact discs (CDs) and storage media which permit the recording of images without any modification to the playback device.

In addition, preferred embodiments of the present invention enable the user to practice pronunciation effectively with an admixture of subtitles by using digital video discs (DVDS) and the most recent multimedia storage media without any modification to the playback device.

What is claimed is:

1. A storage medium on which image data and sound data of uttered sound corresponding to the image is stored in a plurality of separate channels, comprising:
a first sound channel, wherein in at least part of a practice area sound data is stored only in relation to a specific predetermined sound from among a plurality of types of sound; and
a second sound channel, wherein sound data is stored only in relation to sounds other than said specific sound;
wherein at least in part of a practice area, the sound data relating to two predetermined sounds out of a plurality of types of sound which are to be played back is allocated during storage respectively to the first sound channel and the second sound channel.

2. The storage medium according to claim 1, further comprising a control data storage area for storing control data for use in playback control and for storing menu data in which jump destination data is set, making it possible to jump to the practice area in accordance with the command of the user.

3. A storage medium wherein images and subtitle data relating to sounds uttered during the course of these images are stored in a plurality of subtitle channels, comprising:
a first of the plurality of subtitle channels, wherein in at least part of a practice area subtitle data is added only in relation to a specific predetermined sound from among a plurality of types of sound, the addition of subtitle data in relation to sounds other than said specific sound being prohibited; and
a second of the plurality of subtitle channels, wherein the addition of subtitle data in relation to the specific sound is prohibited, while subtitle data is added in relation to sounds other than said specific sound.

4. The storage medium according to claim 3, further comprising a third of the plurality of subtitle channels, wherein subtitle data is added not only in relation to said specific sound but also in relation to sounds other than said specific sound.

5. The storage medium according to claim 4, further comprising a first sound channel, wherein in the practice area sound data is stored only in relation to said specific sound, and a second sound channel, wherein sound data is stored only in relation to sounds other than said specific sound.

6. The storage medium according to claim 3, further comprising a first sound channel, wherein in the practice area sound data is stored only in relation to said specific sound, and a second sound channel, wherein sound data is stored only in relation to sounds other than said specific sound.

7. The storage medium according to claim 6, further comprising a control data storage area for storing control data which allows the sound data of the first sound channel to be output as a first sound and the sound data of the second sound channel as a second sound when said specific sound is designated, while allowing the sound data of the second sound channel to be output as a first sound and the sound data of the first sound channel as a second sound when said specific sound is not designated.

8. The storage medium according to claim 6, further comprising a third sound channel, wherein in the practice area sound data is added not only in relation to said specific sound but also in relation to sounds other than said specific sound.

9. The storage medium according to claim 8, further comprising a control data storage area for storing control data which allows the sound data of the first sound channel to be output as a first sound and the sound data of the third sound channel as a second sound when said specific sound is designated, while allowing the sound data of the second sound channel to be output as a first sound and the sound data of the third sound channel as a second sound when said specific sound is not designated.

10. The storage medium according to claim 9, wherein said control data storage area further storing menu data, and wherein the menu data is structured in such manner as to make it possible to select slow mode, allow the image data to be played back in slow mode in the practice area which is set as a jump destination of said slow mode, the sound height of the sound signal being the same as at normal speed by virtue of the fact that the same waveform is repeated a prescribed number of times in a uniform cycle, and the sound being compressed during storage in such manner that the playback time is of a length which corresponds to the image signal in slow mode.

11. A pronunciation practice system which utilizes storage medium wherein images and subtitle data relating to sounds uttered during the course of these images are stored in a plurality of subtitle channels for the purpose of pronunciation practice, comprising:

a storage medium having a first of the plurality of subtitle channels, wherein in at least part of a practice area subtitle data is added only in relation to a specific predetermined sound from among a plurality of types of sound, the addition of subtitle data in relation to sounds other than said specific sound being prohibited; a second of the plurality of subtitle channels, wherein the addition of subtitle data in relation to the specific sound is prohibited, while subtitle data is added in relation to sounds other than said specific sound; a first sound channel, wherein in the practice area sound data is stored only in relation to said specific sound; a second sound channel, wherein sound data is stored only in relation to sounds other than said specific sound; and a control data storage area for storing control data which allows the sound data of the first sound channel to be output as a first sound and the sound data of the second sound channel as a second sound when said specific sound is designated, while allowing the sound data of the second sound channel to be output as a first sound and the sound data of the first sound channel as a second sound when said specific sound is not designated;

a sound feed device which feeds sound individually to a user engaged in pronunciation practice by causing it to correspond to the first sound output from a playback device;

a sound input device which changes sound uttered by the user into a sound signals; and a mixer which synthesizes the sound signal from the sound input device with the second sound output from the playback device as a sound input signal corresponding to the displaying image by the playback device.

12. The pronunciation practice device according to claim 11, wherein the sound feed device and sound input device comprise a headset having a speaker which is structured in such a manner as to be capable of feeding sound individually to the ears of the user, and a microphone which changes the sound of the user into a sound signal.

13. The pronunciation practice device according to claim 11, wherein the sound feed device and sound input device comprise a receiver which feeds sound to the ears of the user and receives the user's sound while the user grasps it.

14. The pronunciation practice device according to claim 11, wherein the sound feed device and sound input device comprise a microphone set having a microphone which changes the sound of the user into a sound signal and an earphone which feeds sound to the ears of the user, wherein the microphone has a retaining member, which holds the earphone, in a part of said microphone's body.

15. A method of pronunciation practice which utilizes storage medium wherein images and subtitle data relating to sounds uttered during the course of these images are stored in a plurality of subtitle channels for the purpose of pronunciation practice, said storage medium having a first of the plurality of subtitle channels, wherein in at least part of a practice area subtitle data is added only in relation to a specific predetermined sound from among a plurality of types of sound, the addition of subtitle data in relation to sounds other than said specific sound being prohibited; a second of the plurality of subtitle channels, wherein the addition of subtitle data in relation to the specific sound is prohibited, while subtitle data is added in relation to sounds other than said specific sound; a third of the plurality of subtitle channels wherein subtitle data is added not only in relation to said specific sound but also in relation to sounds other than said specific sound; a first sound channel wherein in the practice area sound data is stored only in relation to said specific sound; and a second sound channel, wherein sound data is stored only in relation to sounds other than said specific sound; comprising the steps of;

during pronunciation practice using the sound of the first sound channel, subtitles based on subtitle data of the first of the plurality of subtitle channels or the third of the plurality of subtitle channels and output by playing the storage medium back are displayed on the monitor device, while sound corresponding to the sound signal of the first sound channel and output by playing the storage medium back is fed to the ear of the user, sound corresponding to a sound signal obtained through synthesis of the sound signal of the second sound channel with a sound signal generated in response to the user's pronunciation being fed in such a manner as to be audible to an audience; and during pronunciation practice using the sound of the second sound channel, subtitles based on subtitle data of the second of the plurality of subtitle channels or the third of the plurality of subtitle channels and output by playing the storage medium back are displayed on the monitor device, while sound corresponding to the sound signal of the second sound channel and output by playing the storage medium back is fed to the ear of the user, sound corresponding to a sound signal obtained through synthesis of the sound signal of the first sound channel with a sound signal generated in response to the user's pronunciation being fed in such a manner as to be audible to an audience.

16. A method of pronunciation practice which utilizes a storage medium wherein images and subtitle data relating to sounds uttered during the course of these images are stored in a plurality of subtitle channels for the purpose of pronunciation practice, said storage medium having a first of the plurality of subtitle channels, wherein in at least part of a practice area subtitle data is added only in relation to a specific predetermined sound from among a plurality of types of sound, the addition of subtitle data in relation to sounds other than said specific sound being prohibited; a second of the plurality of subtitle channels, wherein the addition of subtitle data in relation to the specific sound is prohibited, while subtitle data is added in relation to sounds other than said specific sound; a third of the plurality of subtitle channels, wherein subtitle data is added not only in relation to said specific sound but also in relation to sounds other than said specific sound; a first sound channel, wherein in the practice area sound data is stored only in relation to said specific sound; a second sound channel, wherein sound data is stored only in relation to sounds other than said specific sound; and a third sound channel, wherein in the practice area sound data is added not only in relation to said specific sound but also in relation to sounds other than said specific sound; comprising the steps of:

during pronunciation practice using the sound of the first sound channel, subtitles based on subtitle data of the first of the plurality of subtitle channels or the third of the plurality of subtitle channels and output by playing the storage medium back are displayed on the monitor device, while sound corresponding to the sound signal of the first sound channel and output by playing the storage medium back is fed to the ear of the user, sound corresponding to a sound signal obtained through synthesis of the sound signal of the second sound channel with a sound signal generated in response to the user's pronunciation being fed in such a manner as to be audible to an audience; and during pronunciation practice using the sound of the second sound channel, subtitles based on subtitle data of the second of the plurality of subtitle channels or the third of the plurality of subtitle channels and output by playing the storage medium back are displayed on the monitor device, while sound corresponding to the sound signal of the second sound channel and output by playing the storage medium back is fed to the ear of the user, sound corresponding to a sound signal obtained through synthesis of the sound signal of the first sound channel with a sound signal generated in response to the user's pronunciation being fed in such a manner as to be audible to an audience.

\* \* \* \* \*